May 30, 1967  G. A. DOTTO  3,322,240
DISC BRAKE FOR WASHING MACHINE
Filed March 19, 1965  3 Sheets-Sheet 1

INVENTOR
GIANNI A. DOTTO
BY
ATTORNEY

May 30, 1967 G. A. DOTTO 3,322,240
DISC BRAKE FOR WASHING MACHINE
Filed March 19, 1965 3 Sheets-Sheet 3

INVENTOR
GIANNI A. DOTTO
BY
ATTORNEY

United States Patent Office 3,322,240
Patented May 30, 1967

3,322,240
DISC BRAKE FOR WASHING MACHINE
Gianni A. Dotto, Dayton, Ohio, assignor to P. R. Mallory & Co. Inc., Indianapolis, Ind., a corporation of Delaware
Filed Mar. 19, 1965, Ser. No. 441,022
6 Claims. (Cl. 188—163)

The present invention relates to disc brakes and more particularly relates to disc brakes for heavy duty electric motors.

In order to stop electric motors as are used in washing machines and the like, it is necessary to either reverse the magnetic field of the motor or to provide a brake for the motor. The present invention provides a brake which requires less braking force to stop the motor than brakes currently used and which is economical.

It is an object of the present invention to provide a braking device which is automatically effective to stop the rotation of the rotor of an electric motor.

It is an object of the present invention to provide a novel disc brake having a minimum of working parts for heavy duty electric motors.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention provides a means of immediately arresting the rotational force of the rotor disc and its drive shaft upon the de-energization of the associated electric motor. To accomplish this, it should be noted that when the electric motor is de-energized, the magnetic field of a solenoid is interrupted. One end of a brake actuator arm is connected to the core of a solenoid. The second end is pivotally mounted to the assembly and carries the top friction plug. When the field is interrupted, the arm is urged in the direction of a brake disc, the top friction plug is forced toward the disc thereby engaging the disc. A friction plug is mounted so that the disc is between the two plugs and thus, when the top plug is forced downwardly, the disc is clamped therebetween, thereby providing the immediate arresting of the motor associated therewith.

Figure 1:
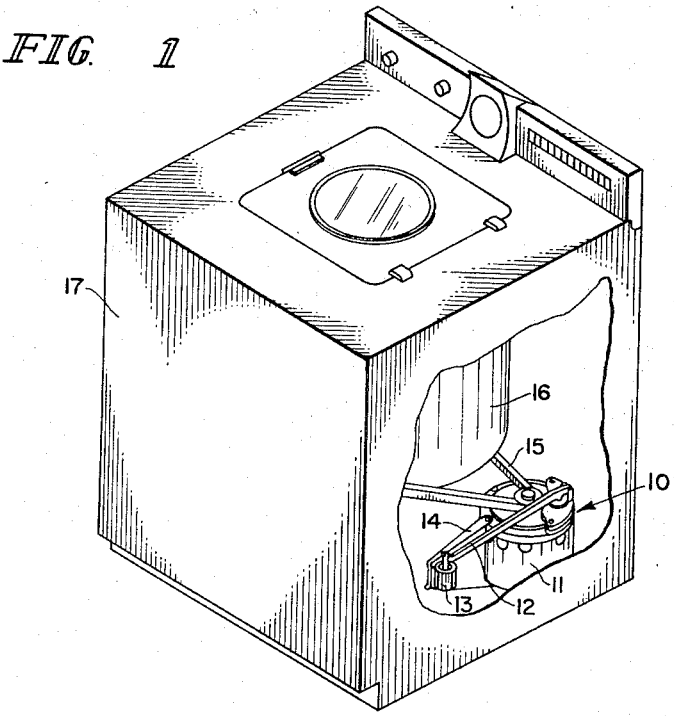
FIGURE 1 is a perspective view of a washing machine cabinet broken away to show the disc brake assembly in relation to the motor.

Referring now to the drawings, in FIGURE 1, the brake assembly 10 is shown associated with the electric motor 11 of washing machine 17. Pulley 15 provides a means for transmitting motion from the motor to tub 16. Brake assembly 10 which is mounted on motor 11 is actuated via arm 12 by solenoid 13. Solenoid 13 is mounted in a spaced apart relationship with motor 11 by its mounting plate 14.

Figure 2:
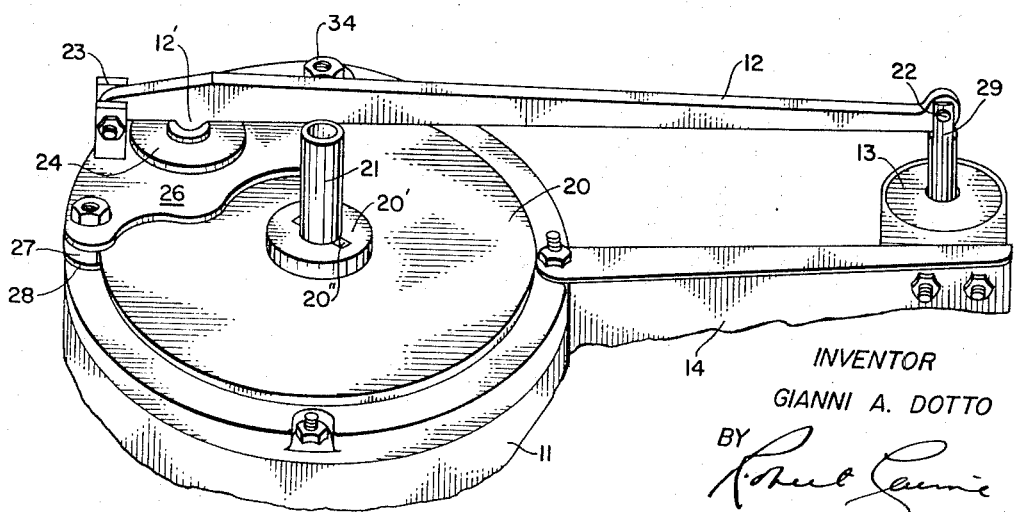
FIGURE 2 is a perspective view of the disc brake assembly.
Figure 3:
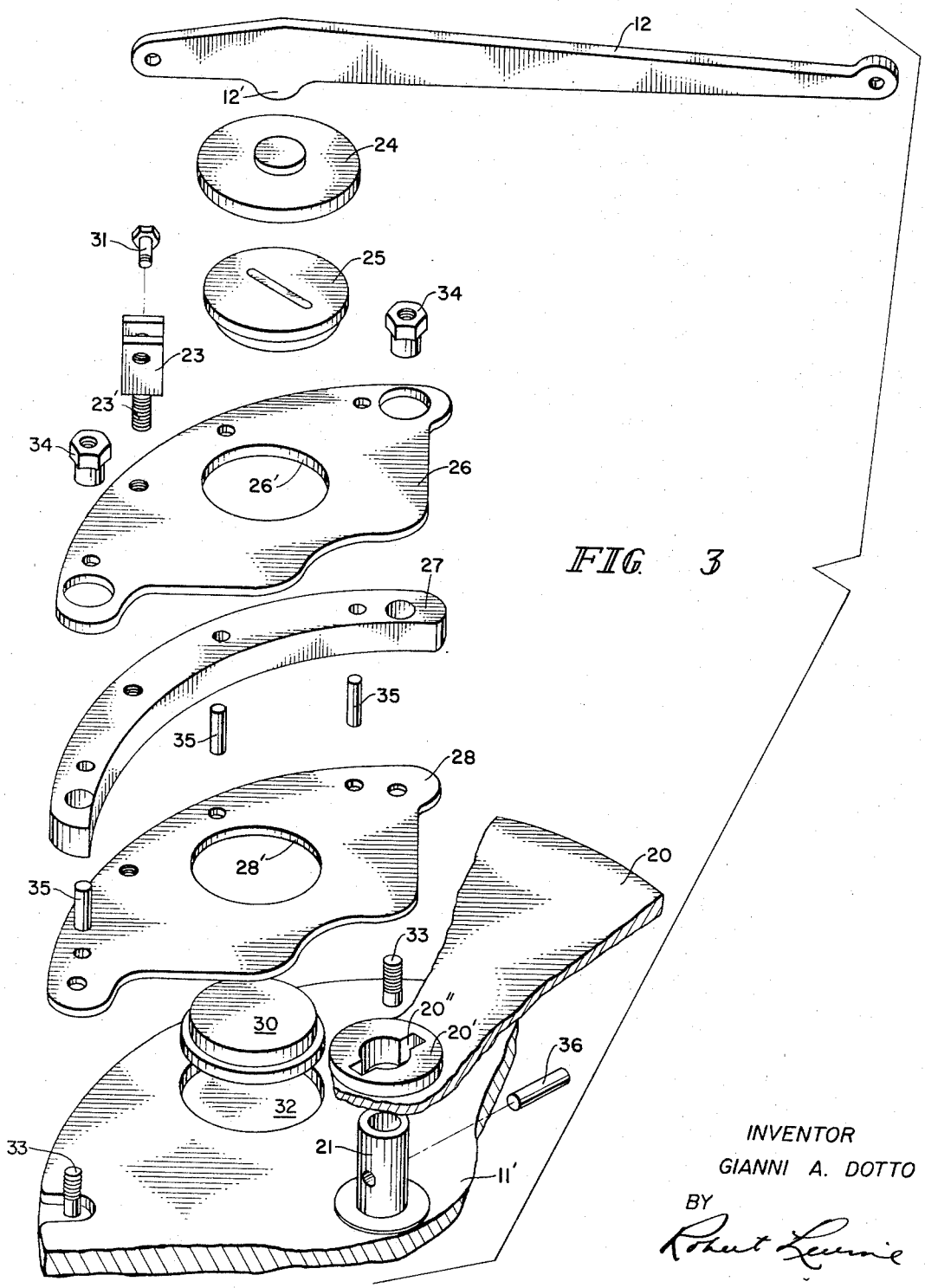
FIGURE 3 is an exploded view of the disc brake assembly.

FIGURE 2 shows the brake assembly in perspective. Annular braking disc 20 is axially mounted on drive shaft 21 of motor 11 so that the disc is free to float axially therearound. Disc 20' is integrally formed with disc 20 and has slot 20" therein which fits over a roll pin 36 (FIG. 3). The pin prevents rotational movement of the disc on the shaft and allows it to rotate with the shaft and float axially therearound. When solenoid 13 is energized, iron core 29 moves in a downward direction carrying actuator arm 12 therewith. Arm 12 is attached to core 29 at one end, while the other end is pivotally mounted in yoke 23. Portion 12' of arm 12 engages an annular mounting plate 24 which is the mounting means for movable friction plug 25. Plug 25 is mounted in a first mounting plate 26.

For a fuller understanding of the present invention, reference is now made to FIGURE 3 which is an exploded view of brake assembly 10. Actuator arm 12, which is pivotally mounted in yoke 23 and secured therein by screw 21, engages mounting plate 24. Friction plug 25 is mounted on plate 24 so that when arm 12 is actuated and moves toward disc 20, plug 25 moves in the same direction. Yoke 23 is seated in brake housing 31 by screw 23'. Brake housing 31 comprises a top mounting plate 26 having pocket 26' wherein plug 25 is mounted, a C-shaped spacer plate 27 and a bottom mounting plate 28 having pocket 28' wherein a second plug 30 is mounted. Plug 30 engages the top surface 11' of motor 11 and is seated in aperture 32 therein. The brake housng 31 is mounted to the engine by mounting screws 33 and secured by mounting bolts 34. Top plate 26, spacer plate 27 and bottom plate 28 are staked together by staking pins 35. The brake housing may also be formed as one integral part.

It can be seen that slot 20" fits over roll pin 36 thereby allowing disc 20 to rotate with the shaft. The pin prevents rotation of the brake disc on drive shaft 21 but permits the disc to rotate with the shaft and also to float around the shaft axially. When the motion of the disc is arrested, the shaft and thereby the motor in turn are arrested.

Figure 5:
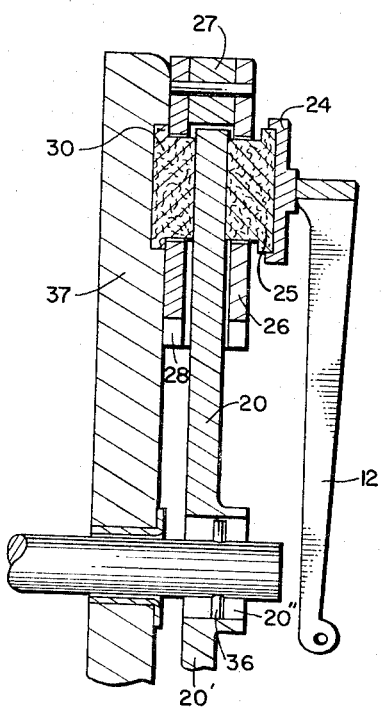
FIGURE 5 is a sectional view of the disc brake assemly taken through section 5—5 of FIGURE 4.

As can be seen in FIGURE 5 disc 20 is free to float between movable plug 25 and stationary plug 30 until the solenoid is actuated. At that time the movement of actuator arm 12 and movable friction plug 25 forces brake disc 20 against the stationary plug 30 so that the disc is gripped therebetween. Since the disc rotates with the shaft, gripping of the disc will thereby stop the rotational movement of the shaft and thus stop the electric motor. It can be seen that stationary friction plug 30 is actually seated in the top surface of motor 11.

Figure 4:
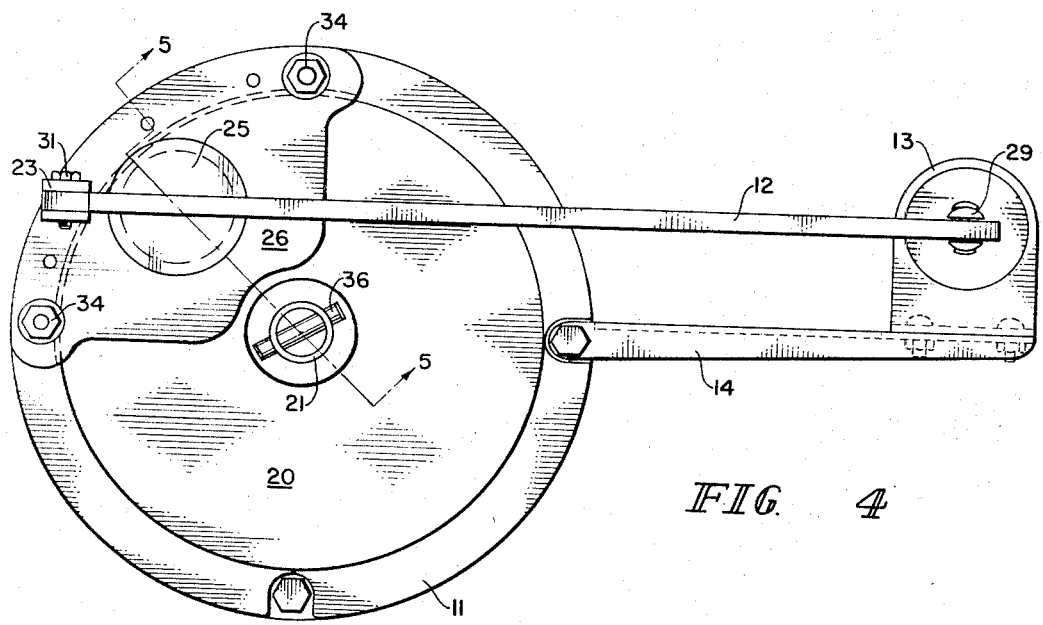
FIGURE 4 is a top view of the disc brake assembly.

FIGURE 4 is a top view of the brake assembly showing the relationship of roll pin 36 to drive shaft 21 and plate 20.

The present invention as hereinabove described and in its representative embodiments is merely illustrative and not exhausting in scope. For instance, the mounting assembly can readily be formed into an integral part rather than using the three separate parts as shown in the representative embodiment, or the fulcrum point of the actuator arm may be varied. Since many widely differing embodiments of the invention may be made without departing from the scope thereof, it is intended that all matters contained in the above description and shown in the accompanying drawing shall be interpreted as illustrative and not in a limiting sense.

Having thus described my invention, I claim:
1. In a brake for preventing further rotational deplacement of the rotor of an electric motor when said electric motor is de-energized, a shaft fixedly connected to and rotatably displaced by said rotor, said shaft carrying a pin, an apertured disc means slidably interfitting with said shaft and said pin, said disc rotating with said shaft, sup- port means including a pair of plates retained in spaced parallel relationship carried by said electric motor, said plates forming a channel therebetween through which a portion of said disc passes, friction means seated in each of said plates so that said disc is positioned therebetween, one of said friction means being displaceable, the other of said friction means being stationary, solenoid means carried by said electric motor and activated when said electric motor is de-energized, said solenoid means including a displaceable means, and an actuator means having one end connected to said displaceable means and having another end connected to said support means, said actuator means overlaying said displaceable friction means, de-energization of said electric motor causing activation of said solenoid means and displacement of said displaceable means, said displaceable means displacing said actuator means so that said actuator means engages with and displaces said displaceable friction means, displacement of said displaceable friction means causing said disc means to be frictionally engaged between said friction means thereby preventing further rotational displacement of said rotor of said electric motor.

2. In a brake for preventing further rotational displacement of the rotor of an electric motor when said electric motor is de-energized, a shaft fixedly connected to and rotatably displaced by said rotor, said shaft carrying a pin, an apertured disc means slidably interfitting with said shaft and said pin, said disc rotating with said shaft, support means including a pair of plates retained in spaced parallel relationship carried by said electric motor, said plates forming a channel therebetween through which a portion of said disc passes, friction means seated in each of said plates so that said disc is positioned therebetween, one of said friction means being displaceable, the other of said friction means being stationary, solenoid means carried by said electric motor and activated when said electric motor in de-energized, said solenoid means including a displaceable core means, and an actuator arm means having one end connected to said core means and having another end connected to said support means, said actuator arm means overlaying said displaceable friction means, de-energization of said eletcric motor causing activation of said solenoid means and displacement of said core means, said core means displacing said actuator arm means so that said actuator arm means engages with and displaces said displaceable friction means, displacement of said displaceable friction means causing said disc means to be frictionally engaged between said friction means thereby preventing further rotational displacement of said rotor of said electric motor.

3. In a brake for preventing further rotational displacement of the rotor of an electric motor when said electric motor is de-energized, a shaft fixedly connected to and rotatably displaced by said rotor, said shaft carrying a pin, an apertured disc means slidably interfitting with said shaft and said pin, said disc rotating with said shaft, support means including a pair of plates retained in spaced parallel relationship carried by said electric motor, said plates forming a channel therebetween through which a portion of said disc passes, friction means seated in each of said plates so that said disc is positioned therebetween, one of said friction means being displaceable, the other of said friction means being stationary, solenoid means carried by said electric motor and activated when said electric motor is de-energized, said solenoid means including a displaceable core means, and an actuator arm means having one end pivotally connected to said core means and having another end pivotally connected to yoke means carried by said support means, said actuator arm means overlaying said displaceable friction means, de-energization of said electric motor causing activation of said solenoid means, said core means pivotally displacing said actuator arm means so that said actuator arm means engages with and displaces said displaceable friction means, displacement of said displaceable friction means causing said disc means to be frictionally engaged between said friction means thereby preventing further rotational displacement of said rotor of said electric motor.

4. In a brake for preventing further rotational displacement of the rotor of an electric motor when said electric motor is de-energized, a shaft fixedly connected to and rotatably displaced by said rotor, said shaft carrying a pin perpendicular to the longitudinal axis of said shaft, an axially apertured disc means slidably interfitting with said shaft and said pin, said disc rotating with said shaft, support means including a pair of plates retained in spaced parallel relationship carried by said electric motor, said plates forming a channel therebetween through which a portion of said disc passes, each of said plates including a pocket, friction means seated in each of said pockets so that said disc is positioned therebetween, one of said friction means being displaceable, the other of said friction means being stationary, solenoid means carried by said electric motor and activated when said electric motor is de-energized, said solenoid means including a displaceable core means, and an actuator arm means having one end pivotally connected to said core means and having another end pivotally connected to yoke means carried by said support means, said actuator arm means overlaying said displaceable friction means, de-energization of said electric motor causing activation of said solenoid means and displacement of said core means, said core means pivotally displacing said actuator arm means so that said actuator arm means engages with and displaces said displaceable friction means, displacement of said displaceable friction means causing said disc means to be frictionally engaged between said friction means thereby preventing further rotational displacement of said rotor of said electric motor.

5. In a brake for preventing further rotational displacement of the rotor of an electric motor when said electric motor is de-energized, a shaft fixedly connected to and rotatably displaced by said rotor, said shaft carrying a pin perpendicular to the longitudinal axis of said shaft, an axially apertured disc means slidably interfitting with said shaft and said pin, said disc rotating with said shaft, support means including a pair of plates retained in spaced parallel relationship carried by said electric motor, said plates forming a channel therebetween through which a portion of said disc passes, each of said plates including a pocket, friction plug means seated in each of said pockets so that said disc is positoned therebetween, said friction plug means including a block of material having an inner side disposed adjacent said disc and an outer side remote from said disc, one of said friction plug means being displaceable, the other of said friction plug means being stationary, solenoid means carried by said electric motor and activated when said electric motor is de-energized, said solenoid means including a displaceable core means, and an actuator arm means having one end pivotally connected to said core means and having another end pivotally connected to yoke means carried by said support means, said actuator arm means overlaying said displaceable friction plug means, de-energization of said electric motor causing activation of said solenoid means and displacement of said core means, said core means pivotally displacing said actuator arm means so that said actuator arm means engages with and displaces said displaceable friction plug means, displacement of said displaceable friction plug means causing said disc means to be frictionally engaged between said friction plug means thereby preventing further rotational displacement of said rotor of said electric motor.

6. In a brake for preventing further rotational displacement of the rotor of an electric motor when said electric motor is de-energized, a shaft fixedly connected to and rotatably displaced by said rotor, said shaft carrying a pin perpendicular to the longitudinal axis of said shaft, an axially apertured disc means slidably interfitting with said shaft and said pin, said disc rotating with said shaft, support means including a pair of plates retained in spaced parallel relationship by a substantially C-shaped spacer plate carried by said electric motor, said plates forming a channel therebetween through which a portion of said disc passes, each of said plates including a pocket, friction plug means seated in each of said pockets so that said disc is positoned therebetween, said friction plug means including a block of material having an inner side disposed adjacent said disc and an outer side remote from said disc, one of said friction plug means being displaceable, the other of said friction plug means being stationary, solenoid means carried by said electric motor and activated when said electric motor is de-energized, said solenoid means including a displaceable core means, and an actuator arm means having one end pivotally connected to said core means and having another end pivotally connected to yoke means carried by said support means, said actuator arm means including a node portion overlaying said displaceable friction plug means, de-energization of said electric motor causing activation of said solenoid means and displacement of said core means, said core means pivotally displacing said actuator arm means so that said node portion of said actuator arm means engages with and displaces said displaceable friction plug means, displacement of said displaceable friction plug means causing said disc means to be frictionally engaged between said friction plug means thereby preventing further rotational displacement of said rotor of said electric motor.

References Cited

UNITED STATES PATENTS

| | | | |
|---|---|---|---|
| 2,657,772 | 11/1953 | Chamberlain | 188—73 X |
| 2,785,710 | 3/1957 | Mowery | 188—171 X |
| 2,937,722 | 5/1960 | Ruet | 188—73 |
| 2,974,756 | 3/1961 | Roehm | 188—171 |
| 3,093,213 | 6/1963 | Limoges et al. | 188—163 X |
| 3,110,365 | 11/1963 | Butler | 188—73 |
| 3,115,956 | 12/1963 | Trombetta | 188—171 |
| 3,233,705 | 2/1966 | Knapp | 188—73 |

DUANE A. REGER, *Primary Examiner.*